United States Patent Office 3,798,096
Patented Mar. 19, 1974

3,798,096
PROCESS FOR FORMING PLASTIC PARTS HAVING SURFACES RECEPTIVE TO ADHERENT COATINGS
John J. Grunwald, New Haven, Eugene D. D'Ottavio, Thomaston, Harold L. Rhodenizer, Bethlehem, and Michael S. Lombardo, Waterbury, Conn., assignors to MacDermid Incorporated, Waterbury, Conn.
No Drawing. Original application Dec. 31, 1969, Ser. No. 889,472, now Patent No. 3,620,933. Divided and this application Nov. 9, 1971, Ser. No. 197,164
Int. Cl. B32b 15/08, 31/12; C09j 5/02
U.S. Cl. 156—151
3 Claims

ABSTRACT OF THE DISCLOSURE

Plastic parts are formed against an anodically treated aluminum surface by molding, laminating, etc., whereby the surface of the formed part after removal of or separation from the aluminum has a high energy level and is receptive to adherent coating of paint or metal plate. In particular, laminates of a thermoplastic resin and a sacrificial cladding of aluminum foil are prepared which, after subsequent stripping of the sacrificial metal cladding, exhibit unique surface properties enhancing the bonding thereto of paints, inks and plated metal deposits.

---

This application is a division of copending application Ser. No. 889,472, filed Dec. 31, 1969, now U.S. Pat. No. 3,620,933.

This invention relates to a process in which plastic parts are formed against an anodically treated aluminum surface by molding, laminating, etc., whereby the surface of the formed part after removal of or separation from the aluminum has a high energy level and is receptive to adherent coatings of paint or metal plate. In particular, in addition to preparing plastic surfaces for acceptance and adhesion of paints, inks or the like, metal plated plastic substrates are prepared by first bonding anodically treated aluminum foil to a plastic substrate to provide a sacrificial cladding on the substrate, which when stripped chemically from the substrate and the stripped surface then catalyzed, affords a substrate of unique surface characteristics for reception of a coating of ink, paint, or of metal deposited thereon by electroless and/or electrolytic techniques.

One of the primary contributions of this invention, accordingly, is to provide a method for preparing a laminate comprising aluminum foil bonded to a thermoplastic sheet, such as sheet of polycarbonate, which after stripping of the aluminum foil yields a plastic sheet having a surface receptive to an adherent coating of paint or to plated metal coatings.

PREPARATION OF THE ALUMINUM FOIL

In preparing a laminate, the first operation involves treating the aluminum sheet or foil anodically in an electrolytic bath containing from about 10–60 percent by weight of phosphoric acid at a temperature of about 70° F. to about 130° F., for about 1 to about 30 minutes or more and at a current density of about 10 a.s.f. (amperes per square foot) to about 75 a.s.f. Preferably, the anodic workpiece is treated at about 90°–110° F. for about 3 to about 7 minutes at 25 to about 55 a.s.f. in an electrolytic bath containing about 20 to about 40 percent by weight of phosphoric acid. The resulting product is aluminum sheet or foil with a tough, adherent coating which is believed to be an oxide coating on its surfaces.

Aluminum alloys, such as aluminum-copper, aluminum-magnesium, aluminum-copper-magnesium-zinc, etc., as well as pure aluminum foil and sheet may be utilized in preparing the aluminum-clad laminates of this invention. The thickness of the aluminum metal can be varied over a wide range and generally will be from about 0.001 to about 0.0098 inch or more and, preferably, will be about 0.001 to about 0.003 inch.

PREPARATION OF LAMINATES

The laminates of the present invention can be prepared using a wide variety of plastic substrates well known in the art, such as polypropylene; polysulfones, ABS, polycarbonate, polyphenylene oxides, etc.

Bonding of a thermoplastic substrate to the aluminum foil is carried out by pressing together a sheet of the thermoplastic material and aluminum foil having an anodically treated surface next to the plastic in a preheated laminating press at a pressure which is generally about 100 to about 1,000 p.s.i.g. and at a temperature of about 150° to about 350° F. or more. The time of the pressing operation may be varied over a wide range and generally will be from about 0.5 to about 10 minutes or more depending upon the particular plastic utilized and the pressure employed. Alternatively, the thermoplastic sheet and the aluminum foil are placed so that the anodically treated surface of the aluminum abuts the surface of the plastic in a lamination press preheated to a temperature of from about 150° to about 350° F. or higher depending on the nature of the plastic. The press is closed and brought up to an initial pressure of about 150 to about 500 p.s.i. after which the pressure is allowed to decrease to 0 p.s.i.g. as plastic softens and flows at which point the laminate is removed from the press.

The metal foil thickness can be varied widely as previously pointed out although, preferably, it will be from about 0.001 to about 0.003 inch in thickness. In a like manner, the thickness of the thermosetting or thermoplastic resin sheet utilized may vary from about 0.0015 to about 0.125 inch or more.

The following examples illustrate the preparation of a variety of laminates of this invention and are to be considered not limitive:

EXAMPLE I

Aluminum foil (Type 1145, H–18–0.0025 inch in thickness) was treated anodically in an aqueous electrolytic bath containing 30 percent by weight of phosphoric acid at 100° F. for 5 minutes at a current density of 40 a.s.f.

A sheet of the anodically treated aluminum foil was placed in a laminating press preheated to a temperature of 325° F. on the upper surface of a sheet of polypropylene (titanium dioxide filled) having a thickness of 0.006 inch. The aluminum sheet was positioned so that an anodically treated surface contacts the plastic sheet and, to prevent sticking, a sheet of cellophane was put between the platen and the lower surface of the polypropylene.

The press was closed, the pressure brought up to 200 p.s.i.g. and then, as the plastic flowed, the pressure gradually dropped off to 0 p.s.i.g. after which the laminate was removed from the press.

After the aluminum foil had been stripped by immersing the laminate in 30 percent hydrochloric acid for 10 minutes at 160° F., the surface was plated electrolessly with nickel and then electrolytically with copper using conventional techniques. The adherent, plated-metal coating exhibited an adhesion value of about 3 pounds per inch.

EXAMPLE II

A sheet of polypropylene having a thickness of 0.125 inch was laminated to an anodically treated aluminum sheet (.002 inch thickness) in the same manner as described in Example I. After the aluminum foil had been removed by immersion in hydrochloric acid (40 percent by weight), the surface was painted with acrylic base lacquer and then allowed to dry. The paint adhered strongly to the prepared surface and when adhesively coated tape was pressed against the paint surface and removed by pulling at a 90° angle, the painted coating remained intact on the substrate surface.

EXAMPLE III

A laminate was prepared from a sheet of ABS (0.125 inch in thickness) and anodically treated aluminum foil (.003 inch in thickness) in the same manner as described in Example I, with the exception that the pressure utilized was 250 p.s.i.g. After stripping the aluminum from the laminate as described in Example IV, a part of the substrate was plated electrolessly with nickel and then electroplated with copper to yield a plated-metal substrate in which the metal coating had a peel strength of about 3 pounds per inch.

Another part of the substrate was painted with an acrylic base lacquer which on drying, adhered tightly to the treated surface.

While the mechanisms of better adhesion through starting with an aluminum clad laminate and then chemically stripping all the metal away before electroless deposition or the coating process is begun is not yet well understood, it appears that some interaction involving or caused by the anodically treated surface on the aluminum foil at the metal-plastic interface during the formation of the plastic surface to be bonded and subsequently stripping of the anodically treated foil chemically is the reason for the greatly improved adhesion between the substrate and the coating, providing peel strengths of at least 5 and as high as 15 pounds per inch. It is believed that an essential aspect of the formation of a bondable surface is that the plastic is capable of flowing and conforming to the anodically treated surface.

What is claimed is:
1. A process for preparing a laminate of aluminum foil and sheet thermoplastic resin for the purpose of providing a high surface energy condition on the plastic surface after chemically stripping the aluminum foil, whereby to improve bonding of subsequently applied coatings on that surface, said process comprising:
 (a) anodically treating aluminum foil in an electrolytic bath containing from about 10 to 60 weight percent phosphoric acid for approximately 1 to 30 minutes at a current density from about 10 to 75 a.s.f. at a temperature of from 70° to 130° F.;
 (b) placing this anodically treated foil in a laminating press in surface contact with a sheet of thermoplastic resin, said press being preheated to a temperature of from about 150° to about 350° F.;
 (c) pressing the laminate at an initial pressure of from 100 to 1000 p.s.i.g. and allowing the pressure to drop off substantially to zero with the softening of the plastic; then removing the laminate from the press.
2. The process of claim 1 wherein the thermoplastic resin is polypropylene.
3. The process of claim 1 wherein the said thermoplastic resin is ABS.

References Cited
UNITED STATES PATENTS

| | | | |
|---|---|---|---|
| 2,552,285 | 5/1951 | Knewstubb et al. | 156—151 |
| 2,798,037 | 7/1957 | Robinson | 204—58 X |
| 3,305,416 | 2/1967 | Kahan et al. | 156—3 |
| 3,347,695 | 10/1967 | Stancell et al. | 117—38 |

ALFRED L. LEAVITT, Primary Examiner
R. H. DAWSON, Assistant Examiner

U.S. Cl. X.R.

117—47 R, 217; 134—41; 148—6.15 R; 156—3, 247, 306, 344; 161—191, 216, 217, 406; 204—33, 58, 146